United States Patent
Li et al.

(10) Patent No.: US 11,398,028 B2
(45) Date of Patent: Jul. 26, 2022

(54) GENERATING AND USING SYNTHETIC TRAINING DATA FOR PLANT DISEASE DETECTION

(71) Applicant: X Development LLC, Mountain View, CA (US)

(72) Inventors: Lianghao Li, Redwood City, CA (US); Kangkang Wang, San Jose, CA (US); Zhiqiang Yuan, San Jose, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 15 days.

(21) Appl. No.: 16/895,759

(22) Filed: Jun. 8, 2020

(65) Prior Publication Data

US 2021/0383535 A1 Dec. 9, 2021

(51) Int. Cl.
| | | |
|---|---|---|
| *G06K 7/00* | (2006.01) | |
| *G06T 11/00* | (2006.01) | |
| *G06T 7/00* | (2017.01) | |
| *G06K 9/62* | (2022.01) | |
| *G06N 3/04* | (2006.01) | |
| *G06N 3/08* | (2006.01) | |

(52) U.S. Cl.
CPC .......... *G06T 7/0012* (2013.01); *G06K 9/6256* (2013.01); *G06N 3/0454* (2013.01); *G06N 3/088* (2013.01); *G06T 11/00* (2013.01); *G06T 2207/10016* (2013.01); *G06T 2207/20081* (2013.01); *G06T 2207/20084* (2013.01); *G06T 2207/30188* (2013.01)

(58) Field of Classification Search
CPC ..... G06T 7/0012; G06T 11/00; G06K 9/6256; G06N 3/0454; G06N 3/088

USPC ......................................................... 345/629
See application file for complete search history.

(56) References Cited

U.S. PATENT DOCUMENTS

2018/0286117 A1* 10/2018 Redden .................. G06T 17/05
2019/0179982 A1*  6/2019 Reese ..................... G06F 30/20
(Continued)

FOREIGN PATENT DOCUMENTS

| CN | 101894388 | 11/2010 |
|---|---|---|
| WO | 2018173622 | 5/2020 |

OTHER PUBLICATIONS

Ouarre,C.etal.,"Novel Data Augmentation Strategies to Boost Supervised Segmentation of Plant Disease" (Aug. 30, 2019); Computers and Electronicsin Agriculture, Elsevier, vol. 165;15 pages; Aug. 30, 2019.*

(Continued)

*Primary Examiner* — Hai Tao Sun
(74) *Attorney, Agent, or Firm* — Middleton Reutlinger (57) ABSTRACT

Implementations are described herein for automatically generating synthetic training images that are usable, for instance, as training data for training machine learning models to detect and/or classify various types of plant diseases at various stages in digital images. In various implementations, one or more environmental features associated with an agricultural area may be retrieved. One or more synthetic plant models may be generated to visually simulate one or more stages of a progressive plant disease, taking into account the one or more environmental features associated with the agricultural area. The one or more synthetic plant models may be graphically incorporated into a synthetic training image that depicts the agricultural area.

18 Claims, 6 Drawing Sheets

(56) References Cited

U.S. PATENT DOCUMENTS

2019/0377946 A1* 12/2019 Genty ............... G06K 9/00664
2019/0385018 A1* 12/2019 Ngo Dinh ........... G06K 9/6254

OTHER PUBLICATIONS

Di Cicco, Maurilio et al.; Automatic model based dataset generation for fast and accurate crop and weeds detection; 8 pages; dated 2017.

Asad, Muhammad, et al.; Weed Detection in Canola Fields Using Maximum Likelihood Classification and Deep Convolutional Neural Network; Information Processing in Agriculture; 11 pages; dated 2019.

Alhnaity, Bashar et al.: Using Deep Learning to Predict Plant Growth and Yield in Greenhouse Environments; 8 pages; dated 2019.

Jones, G., et al.; Crop/Weed Discrimination in Simulated Agronomic Images; Proceedings of SPIE—The International Society for Optical Engineering; 8 pages; dated 2007.

Olsen, Alex et al.; Deepweeds: A Multiclass Weed Species Image Dataset for Deep Learning; Scientific Reports; 12 pages; dated 2019.

Lammie, Corey et al.; Low-Power and High-Speed Deep FPGA Inference Engines for Weed Classification at the Edge; IEEE; 15 pages; dated 2019.

Liu, Bo et al.; Weed Detection for Selective Spraying: a Review; Current Robotics Reports; Springer; pp. 19-26; dated Jan. 31, 2020.

European Patent Office; International Search Report and Written Opinion of Application No. PCT/US2021/036087; 12 pages; dated Sep. 21, 2021.

Douarre, C. et al., "Novel Data Augmentation Strategies to Boost Supervised Segmentation of Plant Disease;" Computers and Electronics in Agriculture, Elsevier, vol. 165; 15 pages; Aug. 30, 2019.

Nazki, H. et al., "Unsupervised Image Translation Using Adversarial Networks for Improved Plant Disease Recognition;" Computers and Electronics in Agricultue, Elsevier, vol. 168; 14 pages; Dec. 20, 2019.

* cited by examiner

GENERATING AND USING SYNTHETIC TRAINING DATA FOR PLANT DISEASE DETECTION

BACKGROUND

Classification of plants in digital imagery has numerous applications. One application is detection and classification of plant disease. Plant diseases may have various causes such as fungi, bacteria, pests (e.g., aphids), and so forth. Plant diseases may take myriad forms, including but not limited to sudden death syndrome, charcoal rot, *septoria* brown spot, soybean cyst nematode, and so forth.

Various types of machine learning models can be trained to detect various types of diseases in plants depicted in digital images. Convolutional neural networks are one non-limiting example. However, the accuracies of these machine learning models depends largely on the amount of training data used to train them. Annotating training images can be prohibitively costly, especially where the images are annotated on a pixel-wise basis. Additionally, obtaining and/or annotating training digital images that depict plant disease is challenging. Plants may exhibit different visual symptoms at different stages of a disease. Some of these visual symptoms—particularly those present during early stages of the plant disease—may go unnoticed by agricultural personnel because they are subtle or otherwise difficult to detect (at least by humans). Consequently, ground truth training data that is collected may be biased towards advanced stages of plant disease. And at these later stages of the disease it may be too late to take remedial action.

SUMMARY

Implementations are described herein for automatically generating synthetic training images that are usable, for instance, as training data for training machine learning models to detect and/or classify various types of plant diseases at various stages in digital images. Annotation of these synthetic training images can be performed automatically as part of the generation process, even at a per-pixel level, significantly reducing or eliminating the costs associated with creating annotated training data from real-life digital images. Moreover, these synthetic training images may include images portraying plants at early stages of disease progression that might otherwise go undetected by humans. When these images are used to train a machine learning model, the machine learning model may then be used, e.g., by a robot, to detect early onset of disease in plants, such that remedial action (e.g., quarantine, culling, pesticide, fungicide, etc.) may be taken.

In various implementations, synthetic plant models may be generated to simulate various stages of a progressive plant disease. These synthetic plant models and the diseases they simulate may take into account a variety of different data points, first and foremost being the type of plant simulated by the synthetic plant model (many plant diseases only afflict certain types of plants) and the type of disease being simulated. Additionally, environmental features associated with an agricultural area such as a field, garden, plot, etc. in which the synthetic plant models are supposed to grow may be taken into account when simulating growth of the synthetic plant models themselves and the disease they are simulated to carry. The environmental features may include agricultural history data such as, for instance, temperature, precipitation, sunlight exposure, fertilizer application, soil composition, pH levels, existing (real-life) vegetation density in the area, or pesticide/fungicide application, to name a few, as well as current conditions (including a lighting condition). In some implementations, these environmental features may include time-series data, e.g., soil composition measurements over time, daily precipitation, daily irrigation, periodic application of pesticides, fungicides, fertilizers, and/or herbicides, weed and disease remediation log entries, etc. Environmental features may, in some implementations, include crop rotation data, such as the type of crop grown in the agricultural area during previous crop cycle(s). This may be relevant where, for instance, a particular plant disease is known to pass from an earlier crop to a later crop, e.g., from leftover roots of the earlier crop.

In some implementations, a machine learning model may be trained to generate synthetic plant models with plant diseases. Inputs to these models may include, for instance, the type of plant being simulated, the environmental features mentioned previously (including time series data where applicable), treatments applied to the plants, attributes of the plant disease (e.g., desired stage of progression), crops grown during previous rotations of the same agricultural area, and so forth. In some implementations, the machine learning model may be trained at least in part on a sequence of images that depict progression of the progressive plant disease. These depictions may include, for instance, ground truth images captured from a controlled garden or plot in which targeted plants are deliberately afflicted with the plant disease-to-be-detected. This may allow the model to be trained to capture subtle, hard-to-see visual aspects of the plant disease during its early stages. Additionally or alternatively, these images may be rendered by agricultural experts familiar with how the plant disease progresses.

In some implementations, the environmental features may include time-series data, such as periodic soil measurements, periodic pH measurements, records of fertilizer/pesticide/fungicide/herbicide deployment, etc. This time series data may be used to generate synthetic plants exhibiting various stages of a targeted plant disease. For example, a time-series machine learning model such as a recurrent neural network, a long short-term memory ("LSTM"), a gated recurrent unit ("GRU") network, etc., may be used with this time-series data to generate 2D or 3D synthetic plants at various disease stages. A new version of the plant and corresponding disease stage may be generated at each iteration based on the previous iteration's output and the current iteration's corresponding environmental features.

In some implementations, a generative adversarial network ("GAN") may be employed to train a generator model to generate realistic synthetic plant models afflicted with various plant diseases and/or whole agricultural scenes that include, among other things, diseased synthetic plant models. To train the generator model, its output may be applied as input across a discriminator model of the GAN. The discriminator model may generate its own output classifying the generator model output as "real" or "synthetic." The discriminator model itself may be trained with a combination of ground truth digital images of real-world plants afflicted with disease, as well as synthetic training images generated by the generator model. The discriminator and generator models may be trained in tandem until the discriminator model can no longer distinguish between ground truth images and those generated by the generator model. In various implementations, these discriminator and generator models may or may not be time-series models.

In some implementations, one or more other machine learning models may be trained to detect plant disease, e.g., using synthetic training images generated using techniques described herein and/or "real" or "ground truth" images that capture real plants with real disease. In some implementations, a single model may be trained to detect (and, for instance, annotate, classify pixels, etc.) a particular type of plant having a targeted plant disease. Some such models may also be trained to detect non-diseased or healthy plants of the same type. For example, a single model could apply pixel-wise annotations that segment/classify plants of a particular type that are both healthy and diseased. In other implementations, multiple models may be trained, e.g., one to detect a set of plants of a particular type, and then another to detect plant disease within that set.

In some implementations, a plant disease detection model may take the form of a time-series machine learning model such as an RNN, LSTM, GRU network, etc., and may be trained to detect/classify/segment plants having targeted plant diseases in images. Such a time-series machine learning model may be trained, for instance, using synthetic training images generated as described previously, in combination with time-series environmental features. For example, temporal sequence of synthetic training images of an area may be generated to include at least some synthetic plants afflicted with a targeted plant disease. The synthetic plants may change across each successive synthetic training image, e.g., by becoming more physically distressed as the plant disease progresses.

In some implementations, the progression of these synthetic plants and the plant disease they simulate may result from the processing of the time-series agricultural data as described above. Additionally, this temporal sequence of synthetic training images may be iteratively applied, along with corresponding time-series data, as inputs for the time-series plant disease detection machine learning model. In some implementations, the time-series model may include an attention mechanism that is more or less likely to annotate data as being caused by disease or having another cause depending on the environmental features (e.g., if the plant has received a large amount of sun over its lifetime, then a plant disease caused by a light-averse fungus is unlikely). Any error in the detection or classification of diseased plants may be used to train the time-series machine learning model. Such a time-series model may also be trained with ground truth data such as temporal sequences of real (i.e. non-synthetic) images of real-life diseased plants over time.

In various implementations, a method may be implemented using one or more processors and may include: retrieving one or more environmental features associated with an agricultural area; generating one or more synthetic plant models, wherein the one or more synthetic plant models visually simulate one or more stages of a progressive plant disease, taking into account the one or more environmental features associated with the agricultural area; and graphically incorporating the one or more synthetic plant models into a synthetic training image that depicts the agricultural area.

In various implementations, the graphically incorporating includes graphically incorporating the one or more synthetic plant models into a digital image captured of the agricultural area using a camera. In various implementations, the graphically incorporating includes graphically incorporating the one or more synthetic plant models into a simulated image of the agricultural area.

In various implementations, one or both of the generating and graphically incorporating is performed using a machine learning model. In various implementations, the machine learning model comprises a generator model that forms part of a generative adversarial network ("GAN"). In various implementations, the machine learning model is trained at least in part on a sequence of images that depict progression of the progressive plant disease.

In various implementations, the one or more environmental features comprise time-series data corresponding to a plurality of environmental conditions of the area. In various implementations, the plurality of environmental conditions include two or more of temperature, precipitation, sunlight exposure, fertilizer application, soil composition, pH levels, or pesticide application.

In various implementations, the method may further include using the synthetic training image to train a machine learning model to generate, based on digital images depicting one or more plants, one or more of: one or more annotations identifying one or more depicted plants having the progressive plant disease; one or more annotations identifying one or more stages of the plant disease evident in one or more of the depicted plants; one or more annotations identifying a severity of the plant disease in one or more of the depicted plants; a prediction of how the plant disease will progress subsequently; or a prediction of how the plant disease will impact crop yield.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
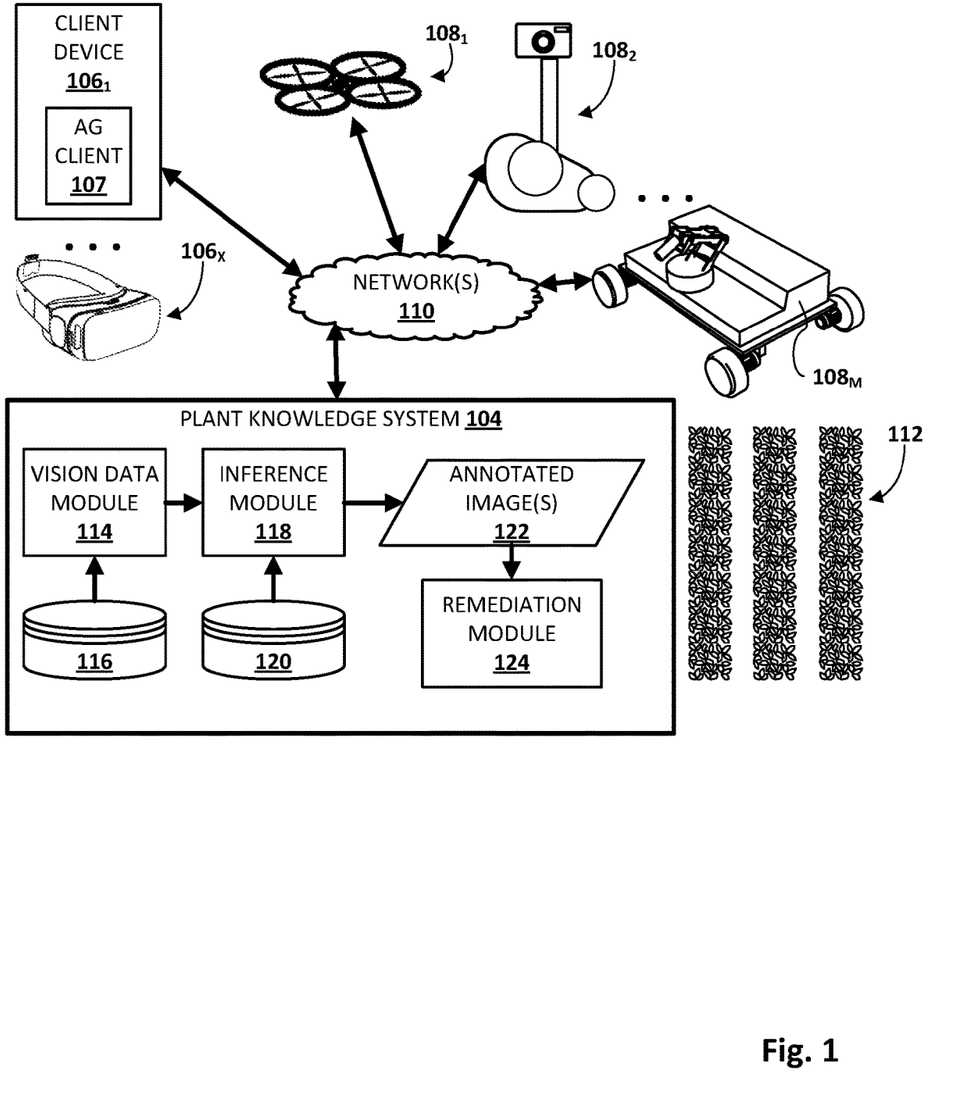
FIG. 1 schematically depicts an example environment in which selected aspects of the present disclosure may be employed in accordance with various implementations.

FIG. 1 schematically illustrates an environment in which one or more selected aspects of the present disclosure may be implemented, in accordance with various implementations. The example environment includes one or more agricultural areas 112 and various equipment that may be deployed at or near those areas, as well as other components that may be implemented elsewhere, in order to practice selected aspects of the present disclosure. Various components in the environment are in communication with each other over one or more networks 110. Network(s) 110 may take various forms, such as one or more local or wide area networks (e.g., the Internet), one or more personal area networks ("PANs"), one or more mesh networks (e.g., ZigBee, Z-Wave), etc.

Agricultural area(s) 112 may be used to grow various types of crops that may produce plant parts of economic and/or nutritional interest. Agricultural area(s) 112 may include, for instance, one or more crop fields, one or more plots, one or more gardens, one or more greenhouses, or any other areas in which there may be an interest or desire to automatically detect, classify, and/or segment particular types of plants. As one non-limiting example, there may be considerable interest and/or benefit in automatically detecting diseased plants in an area 112. Once detected, various remedial actions may be taken, such as flagging the diseased plants' locations for removal or treatment (e.g., pesticide/ fungicide application) by agricultural personnel and/or farming equipment.

An individual (which in the current context may also be referred to as a "user") may operate one or more client devices $106_{1-X}$ to interact with other components depicted in FIG. 1. A client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") $106_X$ that provides an AR or VR immersive computing experience, a "smart" watch, and so forth. Additional and/or alternative client devices may be provided.

Plant knowledge system 104 is an example of an information system in which the techniques described herein may be implemented. Each of client devices 106 and plant knowledge system 104 may include one or more memories for storage of data and software applications, one or more processors for accessing data and executing applications, and other components that facilitate communication over a network. The operations performed by client device 106 and/or plant knowledge system 104 may be distributed across multiple computer systems.

Each client device 106 may operate a variety of different applications that may be used to perform various agricultural tasks, such as crop yield prediction and diagnosis (which may include diagnosis of plant disease using techniques described herein). For example, a first client device $106_1$ operates agricultural ("AG") client 107 (e.g., which may be standalone or part of another application, such as part of a web browser). Another client device $106_X$ may take the form of a HMD that is configured to render 2D and/or 3D data to a wearer as part of a VR immersive computing experience. For example, the wearer of client device $106_X$ may be presented with 3D point clouds representing various aspects of objects of interest, such as fruits of crops, weeds, crop yield predictions, etc. The wearer may interact with the presented data, e.g., using HMD input techniques such as gaze directions, blinks, etc.

In some implementations, AG client 107 may be used to communicate to agricultural personnel instructions and/or information that can help them perform various agricultural tasks. For example, a remediation module 124 (described in more detail below) may generate a report, a map, instructions, and/or any other data that may be presented to an operator of a client device using a graphical user interface, audibly, etc. These data may inform the agricultural personnel where targeted plants such as diseased are located (e.g., by way of pixel-wise annotations or bounding boxes that capture diseased plants), what action(s) should be taken on those plants, a timeframe in which those action(s) should be taken, etc.

In some implementations, one or more robots $108_{1-M}$ may be deployed to perform various agricultural tasks. Performance of some of these tasks, including but not limited to plant disease remediation, may be performed using machine learning model(s) trained on synthetic training data created using techniques described herein. An individual robot $108_{1-M}$ may take various forms, such as an unmanned aerial vehicle $108_1$, a robot (not depicted) that is propelled along a wire, track, rail or other similar component that passes over and/or between crops, wheeled robots $108_2$ to $108_M$, or any other form of robot capable of being propelled or propelling itself past crops of interest.

In some implementations, different robots may have different roles, e.g., depending on their capabilities. For example, in some implementations, one or more of robots $108_{1-M}$ may be designed to capture data, others may be designed to manipulate plants or perform physical agricultural tasks, and/or others may do both. Robots 108 may include various types of sensors, such as vision sensors (e.g., 2D digital cameras, 3D cameras, 2.5D cameras, infrared cameras), inertial measurement unit ("IMU") sensors, Global Positioning System ("GPS") sensors, X-ray sensors, moisture sensors, lasers, barometers (for local weather information), photodiodes (e.g., for sunlight), thermometers, etc.

In various implementations, plant knowledge system 104 may be implemented across one or more computing systems that may be referred to as the "cloud." Plant knowledge system 104 may receive vision data generated by robots $108_{1-M}$ and/or agricultural personnel and process it using various image processing techniques to perform tasks such as plant disease detection, classification, and/or segmentation. In various implementations, plant knowledge system 104 may include a vision data module 114 and an inference module 118. In some implementations one or more of modules 114 and 118 may be omitted, combined, and/or implemented in a component that is separate from plant knowledge system 104.

Plant knowledge system 104 may also include one or more databases. For example, plant knowledge system 104 may include, in communication with vision data module 114, an imagery database 116 for storing image data captured by, for instance, agricultural personnel and/or one or more robots $108_{1-M}$. Plant knowledge system 104 may also include a machine learning model database 120 that includes one or more machine learning models that are trained using synthetic training data generated using techniques described herein to detect diseased plants and/or plant disease. In this specification, the term "database" and "index" will be used broadly to refer to any collection of data. The data of the database and/or the index does not need to be structured in any particular way and it can be stored on storage devices in one or more geographic locations.

Vision data module 114 may be configured to obtain digital images and/or other imagery data from various sources, such as imagery database 116 purposed as an imagery clearinghouse, as well as from sources such as robots $108_{1-M}$. Vision data module 114 may then provide these imagery data to inference module 118. In other implementations, vision data module 114 may be omitted and the functions described herein as being performed by vision data module 114 may be performed by other components of plant knowledge system 104, such as inference module 118.

Inference module 118 may be configured to apply imagery data received from vision data module 114 as input across various machine learning models stored in machine learning model database 120 to generate output. This output may be indicative of diseased plants that are detected, segmented, and/or classified in imagery data received from vision data module 114. To this end, machine learning models stored in database 120 may be trained to detect, classify, and/or segment diseased plants within imagery data, such as two-dimensional digital images of agricultural area(s) 112 captured by agricultural personnel and/or by robot(s) 108.

Various types of machine learning models may be trained, e.g., using synthetic training data generated using techniques described herein, to detect, classify, and/or segment plants afflicted with various diseases in imagery data. In some implementations, a convolutional neural network ("CNN") may be trained to generate output indicative of one or more types of plant diseases and/or diseased plants detected in digital imagery. In FIG. 1, for instance, inference module 118 generates annotated image(s) 122 that include pixel-wise annotations or bounding boxes identifying one or more detected diseased plants. Pixel-wise annotations may be used, for instance, to segment the digital image into portions showing targeted plants and/or targeted plant diseases.

In some implementations, a remediation module 124 may be configured to take remedial action using these annotated and/or segmented images 122. For example, in some implementations, remediation module 124 may deploy one or more robots 108 to take remedial action on the detected diseased plants, such as culling those plants, applying pesticides and/or fungicides, harvesting salvageable plant parts (e.g., fruits, flowers, etc.), and so forth. In other implementations, inference module 118 may output one or more probabilities that one or more diseased plants are detected in an image. In some implementations, remediation module 124 may provide output that includes, for instance, plant disease remediation instructions and/or a map of diseased plants for remediation by agricultural personnel.

In some implementations, one or more components of plant knowledge system 104 may be implemented in whole or in part on a robot 108. For example, inference module 118 may be implemented in whole or in part on a robot 108 that is also equipped with a vision sensor such as a two-dimensional camera. By having an onboard inference module 118, robot 108 may be able to process its own images to quickly detect diseased plants. Robot 108 may also include its own remediation module 124 that enables robot 108 to take remedial action, such as destroying or otherwise remediating the detected diseased plant(s).

As noted previously, obtaining sufficient ground truth training data to train machine learning model(s) such as CNNs to detect plant diseases may be resource-intensive and/or difficult. While images of healthy crops may be captured relatively frequently, pictures of unhealthy crops may be less common, e.g., because the unhealthy plants themselves may be less common. Moreover, by the time humans ascertain that plants are diseased, and begin acquiring images of those plants for training data, those plants may be advanced stages of disease. Humans may not necessarily notice plants in earlier stages of plant disease, where the symptoms may be subtle, difficult for humans to perceive, and/or indistinguishable visually from symptoms having myriad other causes. Accordingly, techniques are described herein for generating synthetic training data with little or no human intervention that can be used to train machine learning model(s) to detect diseased plants and plant diseases.

Figure 2:
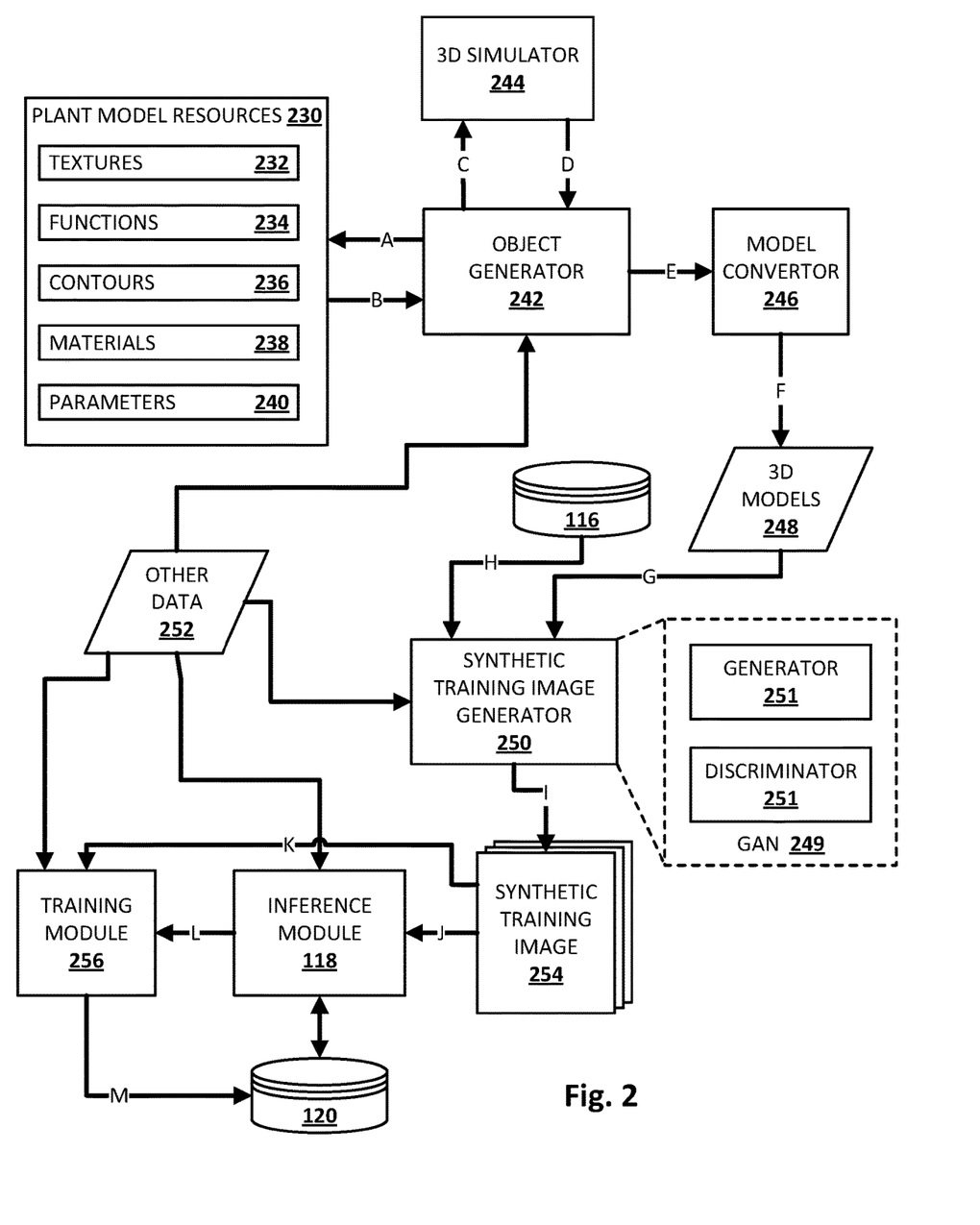
FIG. 2 schematically depicts components and a process for practicing selected aspects of the present disclosure, in accordance with various implementations.

FIG. 2 depicts an example process flow for generating synthetic training data in accordance with various implementations described herein. Other process flows that differ from that depicted in FIG. 2 are contemplated. Starting at top left, plant model resources 230 may include data, parameters, and/or any other information about plants that may be usable to generate realistic synthetic plant models in either 2D or 3D. While the following description will assume the use of a 3D simulator 244, this is not meant to be limiting and techniques described can be employed with 2D plant simulation.

Plant model resources 230 may include, for instance, textures 232 (for leaves, stems, roots, etc.), various functions 234, contours 236 for leafs, stems, roots, and/or other aspects of plants, materials 238, and miscellaneous parameters 240 such as leaf sizes, scale ratios, desired resolution, etc. Textures 232 may play an important role in plant disease detection/diagnosis because, for instance, many plant diseases are manifested as changes to texture of leaves, stems (e.g., rot), roots, etc. Functions 234 may include, for instance, programmatic routines, computer-readable instructions, scripts, pseudo-code, algorithms, heuristics, statistics, etc., that are used, e.g., by an object generator 242 or 3D simulator 244, to generate 3D plant models. Materials 238 may include, for instance, data similar to texture data that is used to simulate different types of plant structures, such as stems. In some implementations, materials 238 may include disease data, such as data that would cause disease spots or blemishes to be rendered as part of diseased plant leaves, stems, fruit, flowers, etc.

A series of arrows A-M is depicted in FIG. 2 to demonstrate one example of how data may be processed in order to generate synthetic training images 254, and how those synthetic training images 254 may then be used to train one or more machine learning models stored in machine learning model database 120. At arrow A, object generator 242 (which may or may not be part of plant knowledge system 104 and may be implemented using any combination of hardware and computer-readable instructions) may randomly select various assets from 3D model resources 230.

This selection may be random or pseudo random in order that each 3D model plant that is generated for inclusion in training data is different from each other, as would be the case in real life. In some implementations, the random or pseudo random selection may be based at least in part on other data 252, which may include environmental features (e.g., time-series data) associated with the agricultural area under consideration. In some instances this other data 252 may include observable attributes of the agricultural area that are evidenced in a digital image of the agricultural area that is intended to be augmented with synthetic (e.g., diseased) plants. For example, assets that are more consistent with the environmental features of the agricultural area depicted in the digital photograph may be weighted more heavily (and hence, more likely to be selected) than other assets that are less consistent with the environmental conditions. These randomly-selected assets may be returned to object generator 242 at arrow B.

At arrow C, the randomly-selected assets and/or an object representative thereof (e.g., an XML file that spells out how many leaves, their size, a size of the plant, a color of the plant, parameters of a targeted plant disease, etc.) may be provided to 3D simulator 244, which also may or may not be part of plant knowledge system 104 and may be implemented using any combination of hardware or computer-readable instructions. Based on these objects and/or the assets represented/conveyed by these objects, 3D simulator 244 may generate synthetic plant model(s) that simulate targeted plants, including plants having targeted plant diseases. For example, to train a machine learning model to detect soybean plants afflicted with disease, 3D simulator 244 may generate a plurality of 3D model soybean plants showing symptoms of the disease. 3D simulator 244 may return the generated 3D models to object generator 242 at arrow D or may provide them directly to another downstream component.

In some implementations, the other data 252 may be used, e.g., by object generator 242 and/or 3D simulator 244, to generate the objects/3D models. For example, as described previously, the other data 252 may affect probabilities of constituent assets of resources 230 being selected stochastically. The agricultural area of interest may be, for instance, a field or plot of which one or more digital images have been captured, e.g., by one or more robots $108_{1-M}$. These digital images may effectively be used as canvases on which 3D models can be graphically incorporated to generate the synthetic digital images 254. In fact, these digital images, prior to being augmented with synthetic plants, may be referred to herein as "canvas" digital images. In some implementations, synthetic plants may be graphically incorporated into fully synthetic/simulated scenes, in addition to or instead of digital images capturing "real" agricultural areas.

In some implementations, other data 252 may include, for instance, an agricultural history of the agricultural area 112 during a time interval, e.g., a time interval that precedes capture of image data that depicts the agricultural area. This agricultural history may include a wide variety of data about the agricultural area being depicted, such as precipitation data, stewardship data, soil data, weather data, fertilizer data, herbicide data, pest data, plant disease data, etc. In some implementations, agricultural history and/or other data points within other data 252 may be simulated entirely, simulated based on ground truth data, simulated randomly, etc.

In some implementations, the other data 252 may include time-series data corresponding to one or more environmental conditions of the agricultural area, such as daily precipitation, daily sun exposure, periodic fertilizer application, periodic temperature readings, periodic soil composition measurements, periodic soil pH levels, and/or pesticide/fungicide applications, to name a few. In some such implementations, object generator 242 and/or 3D simulator 244 may employ a time-series machine learning model such as a recurrent neural network ("RNN"), a long short-term memory ("LSTM"), a gated recurrent unit ("GRU") network, etc., to process this time-series data and generate 3D synthetic plants afflicted with various plant diseases. For example, a new 3D version of a synthetic plant at a given stage of a plant disease may be generated at each iteration of an RNN or LSTM based on the previous iteration's output and the current iteration's corresponding time series data.

In some implementations, these stages of plant disease may correspond to severity of the plant disease. For example, a plant afflicted with a plant disease in its early stages may be salvageable because the disease is not yet so severe as to doom the plant for any useful purpose. In such a situation, remedial actions such as applying a pesticide or fungicide, or trimming infected portions of the plant, may still have value. By contrast, a plant afflicted with the plant disease in its later stages may be beyond help, and culling/removal may be the best option to prevent and/or slow spread of the plant disease to other healthier plants. As will be explained below, by training plant disease detection models using depictions of plant disease stages, it is possible for those models to be trained to output a severity of the plant disease based on an estimated stage of plant disease.

A time-series machine learning model such as an RNN, LSTM, or GRU-based network may be trained to generate 3D plant models in various ways. For example, a temporal sequence of ground truth digital images depicting examples of a plant disease to be modeled may be captured, e.g., from a controlled test garden in which the plants are purposefully afflicted with the disease. Other data 252, such as time-series data indicative of environmental conditions of the controlled test garden when the images were captured may also be obtained. The environmental conditions time-series data may then be iteratively applied as inputs across the time-series machine learning model to generate, at each iteration, output indicative of expected disease progression. In some implementations, the output of a previous iteration may also be applied as input across the time-series model, in effect providing the time-series model with memory.

In some implementations, the output generated at each iteration may include 3D plant models of the diseased plant(s) at that point in time. In other implementations the output may include predicted features of diseased plant(s) at that point in time, such as leaf size, number of leaves per plant, plant height, leaf color, spotting frequency, wilting, rotting pervasiveness, etc. In either case, the output may be compared to ground truth attribute(s) of diseased plants depicted in the corresponding ground truth digital image of the temporal sequence. The difference or error between the output and the ground truth may be used to train the time-series machine learning model, e.g., using techniques such as back propagation, gradient descent, etc.

As a consequence of utilizing other data 252, especially with time-series machine learning models, the resultant 3D plant models may be highly realistic, particularly in the context of the agricultural area 112 depicted in the digital image onto which they are graphically incorporated. For example, if the environmental conditions in agricultural area 112 have been unfavorable to a type of plant disease being modeled, then the 3D plant models may correspond to healthy plants, e.g., with robust color (e.g., deep and uniform green), large and/or numerous leaves, strong/numerous branches, etc. By contrast, if the environmental conditions in the agricultural area have been favorable for the type of plant disease being modeled, the resultant 3D plant models may correspond to less healthy plants, e.g., that are smaller and/or include less leaves, and/or that have a less healthy color (e.g., brown spots or grayish color).

It might be the case that in the agricultural area 112 of interest, strong action has been taken to reduce or eliminate the type of plant disease being modeled. For example, the agricultural history of the agricultural area 112 may indicate periodic application of pesticides and/or fungicides that target the plant disease being modeled. Consequently, the digital image capturing the agricultural area 112 may depict few, if any diseased plants. Nonetheless, it may be desired to use the digital image as a canvas for synthetic training data.

Accordingly, in some implementations, one or more data points of agricultural history may be modified in order to influence generation of 3D plant models so that the resultant models have desired attribute(s). For example, the fact that a fungicide or pesticide has been applied periodically may be ignored or suppressed when generating the 3D plant models to ensure that the 3D plant models appear more diseased. As another non-limiting example, precipitation and/or sunlight exposure may be inflated from ground truth reality to improve the appearance of the resultant 3D plant models, e.g., so that visible defects in the synthetic plants are attributable to disease, not lack of water.

In some implementations, object generator 242 and/or 3D simulator 244 may take into account conditions at the time a digital image of the agricultural area 112 of interest was captured. For example, the digital image may depict the agricultural area 112 under a lighting condition that existed in the agricultural area when a camera captured the digital image. The sun may be out or occluded by clouds. Depending on the time of day and/or time of year, the sun may be at different positions in the sky. Consequently, the agricultural area may be illuminated in different ways with different amounts of light. Moreover, the sun's position in the sky at the time the image was captured may cause objects such as plants to cast shadows of various shapes and sizes. Therefore, in some implementations, other data 252 may include attribute(s) of the lighting condition at the time the digital image of the agricultural area was captured. This lighting condition data may be conveyed in the image itself or extracted and included, for instance, as metadata that accompanies the image.

In some implementations, object generator 242 and/or 3D simulator 244 may render 3D plant models to include visual features that are dictated based on the lighting condition. For example, leaves may exhibit one hue under a cloudy sky, another under a noon sun, another at dawn/dusk, etc. And depending on the textures of the 3D plant models, their leaves and/or other structure may reflect various amounts of sunlight. Additionally or alternatively, in some implementations, an observed wetness of the area may be accounted for. For example, if the digital image was captured during or soon after a rain storm, plants in the area may have a shimmer due to their wetness. The presence of such a shimmer may be determined, e.g., from the image itself or from environmental data associated with the agricultural area, and used to create a similar shimmer on 3D plant models.

Referring back to FIG. 2, in some implementations, at arrow E, object generator 242 may provide the 3D plant model(s) to a model convertor 246. As with other components in FIG. 2, model convertor 246 may or may not be part of plant knowledge system 104 and may be implemented using any combination of hardware and/or computer-readable instructions. At arrow F, model converter 246 may be configured to convert the 3D models into various formats of 3D models 248, some of which may be standardized formats for representing 3D objects, such as *.obj, *.mtl, *.urdf, and so forth. In other implementations, model convertor 246 may be omitted.

At arrow G, the 3D plant models 248 may be provided (from model convertor 246, object generator 242, or even 3D simulator 244) to a synthetic training image generator 250. Synthetic training image generator 250, which again may be implemented using any combination of hardware and/or computer-readable instructions, may be configured to carry out selected aspects of the present disclosure to generate synthetic training data, such as one or more synthetic training images 254. For example, at arrow H, one or more images may be retrieved from imagery database 116 (e.g., via vision data module 114). These images may depict agricultural area(s) (e.g., 112) under a variety of conditions. For example, multiple images may capture the same agricultural area under a cloudy sky, during a rain storm, on a sunny day, on a foggy day, at different times of day (at which points the sun will be at different positions in the sky), and so forth.

In addition to the imagery retrieved from database 116, in some implementations, at least some of the other data 252 mentioned previously may also be retrieved and used by synthetic training image generator 250 for use in generating synthetic training images 254, particularly for graphically incorporating the 3D plant models into the canvas digital images that depict the agricultural area 112. This may include, for example, the other data 252 that coincides with the agricultural area(s) depicted in the imagery, such as environmental conditions leading up to and including the moment at which the imagery was captured. This may also include the lighting condition mentioned previously. For example, synthetic training image generator 250 may render adjacent 3D plant models on the two-dimensional canvas image and shadows that simulate real life shadows that would be present if the 3D plant models were actually present in the agricultural area 112.

As shown in FIG. 2 and mentioned previously, synthetic training image generator 250 may be configured to obtain a digital image that captures an area from database 116. Based on this lighting condition at the time the image was captured and/or based on an agricultural history of the area, synthetic training image generator 250 may generate a synthetic training image 254 to depict the plurality of 3D synthetic plants in the agricultural area. In some implementations, the generating may include graphically incorporating the plurality of 3D plant models into the digital image capturing the agricultural area 112, taking into account the lighting condition at the time the underlying digital image was captured.

In some implementations, and as shown in the dashed exploded view, synthetic training image generator 250 may employ a generator model 251 that is trained as part of a larger generative adversarial network ("GAN") 249 to generate synthetic training images 254 that are as realistic as possible. Such a GAN 249 may also include a discriminator model 253 that is trained to generate output that predicts whether an input image is, for instance, "synthetic" or "real." The generator model 251 and discriminator model 253 may or may not be trained in tandem. The discriminator model 253 may be fed both real images (e.g., captured using a camera) and synthetic images generated by the generator model 251. The fact that the discriminator model 253 correctly classifies an image as synthetic may be used as a negative training example that causes the generator model 251 to improve its own performance. When the discriminator model 253 incorrectly classifies a "real" image as synthetic, the discriminator model 253 may be trained to improve its own performance. The generator model 251 may be considered to be sufficiently trained when it is able to "fool" the discriminator model 253, e.g., more than some threshold number of times.

In some implementations, synthetic training image generator 250 may be further configured to space the plurality of 3D synthetic plants from each other in the synthetic training image 254 based on various pieces of other data 252, such as environmental conditions leading up to the moment the digital image was captured and/or the presence of other plants. Synthetic training image generator 250 may also take into account simulated diseases of the synthetic plants it is graphically incorporated into the image. If a particular disease tends to cause plants to be sparsely distributed and/or spaced from each other, then the synthetic plants may be sparsely distributed in the synthetic training image 254. By contrast, if an underlying cause of a plant disease is overcrowding, then the diseased synthetic plants may be spaced closer together.

Referring back to FIG. 2, at arrow I, synthetic training image generator 250 may output synthetic training images 254. At arrow J, an inference module 118 (e.g., the same as or sharing characteristic(s) with inference module 118 of FIG. 1) may apply the synthetic training images 254 as input across one or more machine learning models (e.g., CNN) from machine learning model database 120. As shown by the arrow, in some implementations, especially where the plant disease detection machine learning model is a time-series model, at least some of the other data 252 may also be applied across the machine learning model.

Meanwhile, at arrow K, synthetic training images 254 (and in some cases, other data 252) may also be provided to a training module 256. Because synthetic training images 254 are generated using 3D synthetic plants that are graphically incorporated at known pixel locations, they may comprise annotated or labeled training data that can compared by training module 256 with the output generated by inference module 118 at arrow L (e.g., pixel-wise plant disease classifications or bounding boxes similar to 122 in FIG. 1). The error between the output of inference module 118 and the annotations/labels can be used by training module 256 to train the machine learning model, which is updated in database at arrow M. In some implementations, non-synthetic (i.e. ground truth) images depicting agricultural areas in which plants afflicted with targeted plant diseases are present may also be used by training module 256 as training data. In some such implementations, these ground truth images may be labeled, e.g., using bounding boxes or on a pixel-wise basis, to identify locations of targeted plants.

Figure 3:
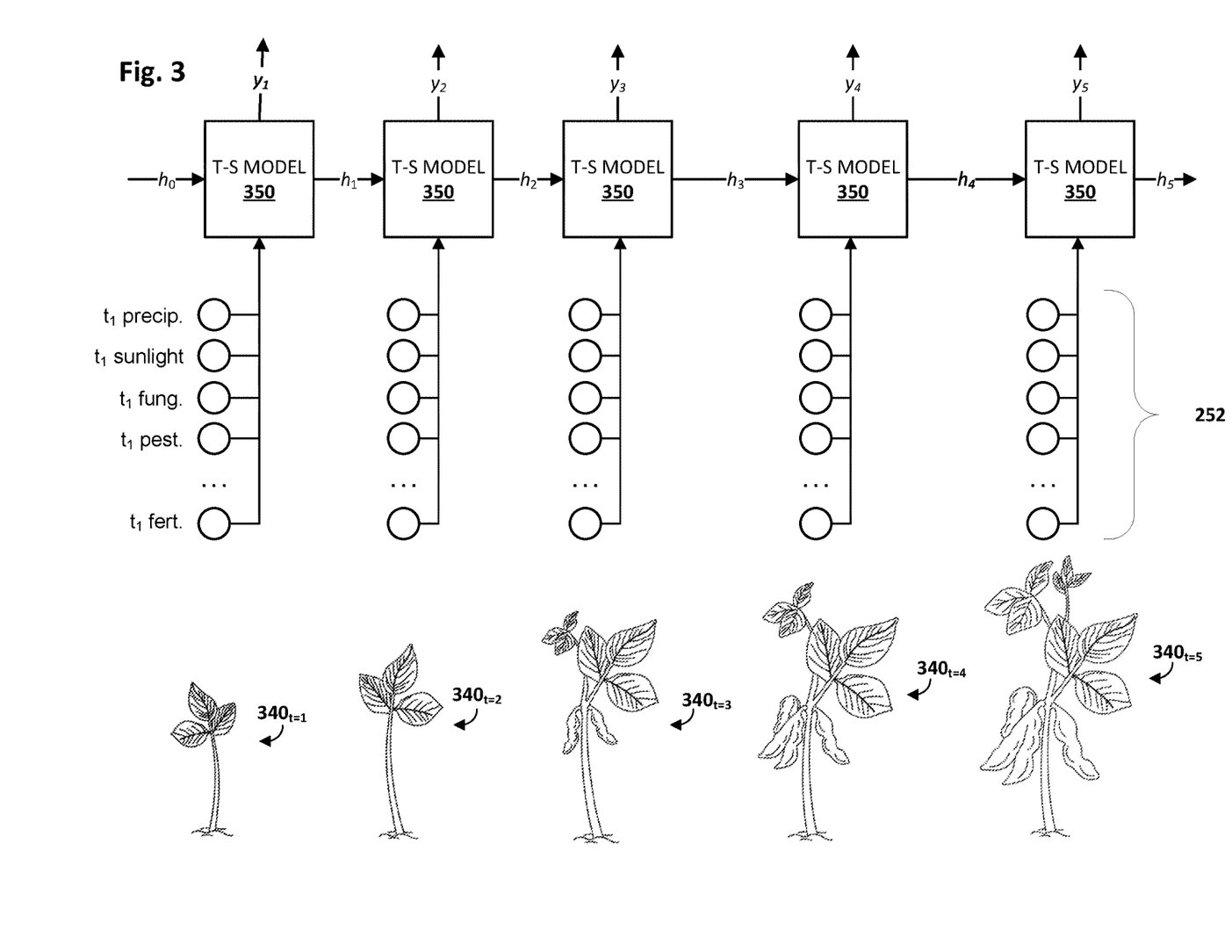
FIG. 3 depicts a temporal sequence of images capturing a healthy plant, to illustrate how that temporal sequence may be used to train a time-series machine learning model.

FIG. 3 depicts a temporal sequence of images capturing a healthy plant, to illustrate how that temporal sequence may be used to train a time-series machine learning model to detect plant disease (and in this case, lack of plant disease). A time-series ("T-S" in FIG. 3) model 350 such as an RNN, LSTM, GRU, etc. (any of which may include a CNN), is shown in an "unfolded" state in FIG. 3 to demonstrate how it operates, but it should be understood that in various implementations, time-series model 350 may be a single model (or pipeline of models) that is applied during each of multiple iterations.

At time t=1, time-series model 350 receives a null value as prior input $h_0$ because there is no previous iteration input. However, time-series model 350 also receives various other data that is used to generate outputs $y_1$ and $h_1$ (the latter which is provided as input during the next iteration). In particular, time-series model 350 receives time-series data points for time t=1 that include, for instance, $t_1$ precipitation, $t_1$ sunlight (e.g., minutes or hours of sunlight exposure during a time interval, magnitude of sunlight received, etc.), $t_1$ fungicide application (e.g., whether fungicide was applied during this time interval, an amount of fungicide applied, etc.), $t_1$ pesticide application (similar to fungicide), and $t_1$ fertilizer application. As shown by the bracket at right, these time-series data points may be part of other data 252 described previously.

The data points depicted in FIG. 3 (and that will be depicted in FIG. 4) are for example only, and are not to be limiting. For example, in some implementations, multiple different fungicides, multiple different pesticides, and/or multiple different fertilizers may be applied to an agricultural area during a given day, during a crop cycle, etc. Similar data points are applied at times t=2 to t=5, corresponding to time-series data within the respective time intervals associated with those iterations of time-series model 350.

Also applied as input across time-series model 350 at each iteration is a digital image 340 of a plant at a particular stage of the plant's growth cycle. There are five iterations (t=1 to t=5) of time-series model 350 depicted in FIG. 3 and five different digital images $340_{t=1}$, $340_{t=2}$, ... $350_{t=5}$. In FIG. 3 the plant depicted in digital images 340 is healthy and disease free. Consequently, at each stage, the plant and its constituent components (e.g., leaves, branches, stems, fruits, etc.) are more advanced, typically larger and more robust. For example, in digital image $340_{t=1}$, the plant has three leaves and is relatively short because it is in an early growth stage. As the digital images 340 progress, the plant becomes larger and fuller until digital image $340_{t=5}$, in which the plant now has nine leaves from three different sprouts of leaves, as well as four pods, each with three fruit (e.g., peas, soybeans, etc.).

At each iteration t=1, the corresponding digital image $340_{t=i}$, may be applied as input across time-series model 350, along with other data 252 ($t_i$ precipitation, $t_i$ sunlight, etc.) to generate output $y_i$. In addition, at least some data $h_{t=i-1}$ computed during the previous iteration may be applied as input across time-series machine learning model 350, in effect giving model 350 memory. In the implementation of FIG. 3, the output)), at each iteration t=i may be, for instance, an annotated version of digital image 340 that includes pixel-wise annotations of detected plant disease, bounding boxes capturing plants believed to be afflicted with the disease, etc.

If time-series model 350 is undergoing training, then training annotations or labels may be available along with the digital images $340_{t=1}$, $340_{t=2}$, ... $350_{t=5}$. These training annotations and/or labels may have been generated automatically if images 340 are synthetic training images generated using techniques described herein. Additionally or alternatively, these training annotations or labels may be human-curated, e.g., if digital images are simply digital images of real plants that are reviewed by humans.

In some implementations, these training annotations or labels may include or be annotated with pixel-wise classifications or bounding boxes indicating presence, evidence, and/or severity of a targeted plant disease in individual plants. Alternatively, if time-series model 350 simply provides output indicative of presence, absence and/or severity of the disease, or a likelihood that any depicted plant(s) are afflicted with the disease, then the digital images $340_{t=1}$, $340_{t=2}$, ... $350_{t=5}$ may be accompanied with labels that indicate, as applicable, presence/absence/severity of the plant disease, likelihood that the plant disease is present, etc. Whatever form the training annotations or labels, they may be compared to the output y at each iteration to generate a difference or error. This difference or error may be used to train time-series model 350, e.g., using techniques such as back propagation and/or gradient descent.

Figure 4:
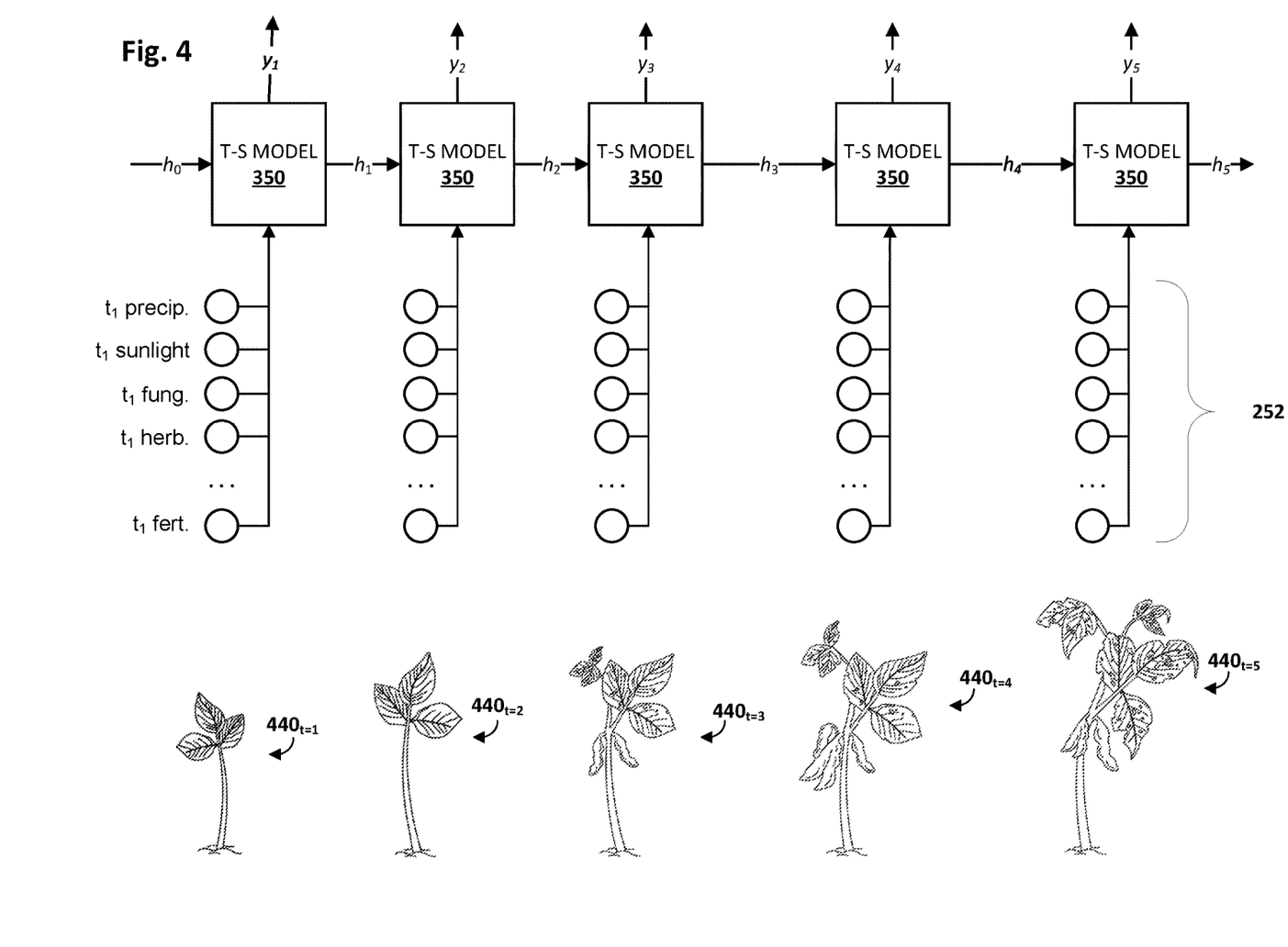
FIG. 4 depicts a temporal sequence of images capturing a diseased plant, to illustrate how that temporal sequence may be used to train a time-series machine learning model.

FIG. 4 is similar to FIG. 3 except that FIG. 4 depicts a temporal sequence of digital images $440_{t=1}$, $440_{t=2}$, ..., $440_{t=5}$ capturing an unhealthy, diseased plant, to illustrate how that temporal sequence may be used in a similar fashion as the sequence in FIG. 3 to train time-series machine learning model 350 to detect plant disease. In this example, time-series model 350 is once again depicted "unfolded" to show five iterations (t=1, t=2, t=5) of its application.

This time, in the temporal sequence of digital images $440_{t=1}, 440_{t=2}, \ldots, 440_{t=5}$, the plant is depicted in various stages of its growth cycle while afflicted with a plant disease. In the first two images $440_{t=1}, 440_{t=2}$, symptoms of the plant disease are difficult to perceive, at least for humans, such that they appear similar to the first two digital images $340_{t=1}, 340_{t=2}$ of FIG. 3. However, there may be subtle visual cues, not necessarily visible to the naked eye, which can be detected in pixels of a digital image capturing the plant. And these subtle visual cues may be more likely to be detected in the presence of the other data. For example, and as described shortly, in some implementations, time-series model 350 may include an attention mechanism that is triggered from other data 252 to apply more or less weight to visual cues as being indicative of plant disease.

Symptoms of the plant disease become more evident in the digital images depicting later stages of the plant's growth cycle, especially in comparison to the digital image of the same iteration in FIG. 3. For example, the plant depicted in third digital image $440_{t=3}$ is somewhat smaller than the plant depicted in third digital image $340_{t=3}$ of FIG. 3. There is also some light spotting beginning to appear in third digital image $440_{t=3}$ in FIG. 4. These symptoms become more pronounced and obvious as time goes on. In digital image $440_{t=4}$ the spotting is becoming even more pronounced, and the plant is noticeably smaller than the plant in digital image $340_{t=4}$ of FIG. 3. By the time of digital image $440_{t=5}$, the plant is in obvious distress, with the leaves wilting and the number of pods (3) being less than were present (4) in the previous digital image $440_{t=4}$.

As was the case with the temporal sequence of images $340_{t=1}, 340_{t=2}, \ldots, 340_{t=5}$ in FIG. 3, the temporal sequence of digital images $440_{t=1}, 440_{t=2}, \ldots, 440_{t=5}$, in FIG. 4 may be used, along with the other depicted data points, to train time-series model 350 to generate output indicative of presence of plant disease. For example, $440_{t=1}, 440_{t=2}, \ldots, 440_{t=5}$, may be labeled or otherwise annotated to indicate presence of plant disease. In this case, it is likely the other data 252 in FIG. 4 differs in some respect from the other data of FIG. 3. For example, if the plant disease is caused by a fungus, then it is likely that the $t_i$ fungicide ("fung.") in FIG. 4 is different at one or more iterations than it was in FIG. 3. For example, fungicide may have been applied one or more times to the plant depicted in digital images $340_{t=1}, 340_{t=2}, \ldots, 340_{t=5}$, whereas with $440_{t=1}, 440_{t=2}, \ldots, 440_{t=5}$, fungicide may have been applied less often (or not at all), or a different type of fungicide that doesn't target the plant disease was applied, etc.

Many plant diseases' symptoms may be similar in appearance, e.g., yellow or brown spots may appear in a variety of different plant diseases. Moreover, some of these symptoms, such as wilting, discoloration, etc., may also be indicative of other problems, such as drought, lack of sun, soil composition problems, other diseases, etc. Accordingly, and as mentioned previously, in some implementations, the other data besides the temporal sequences of digital images 340/440 may be helpful in accurately detecting plant disease, and not detecting false positives.

To this end, in some implementations, time-series machine learning model 350 may include an attention mechanism that is controlled or triggered by the other data, e.g., to more heavily weight particular visual cues as being indicative of plant disease where the conditions are conducive to that plant disease. As an example, subtle discoloration detected early in the growth cycle may be diagnosed (e.g., pixel-wise annotated) by model 350 as likely related to a particular plant disease if the other data indicates a favorable environment for the plant disease. By contrast, if the other data reveals conditions that are inhospitable to the plant disease, then that same discoloration may be more likely to be pixel-wise annotated as being caused by a different plant disease, or by other environmental features (e.g., lack of water, too much fertilizer, etc.).

In various implementations, model 350 may be trained to generate annotation(s) (e.g., pixel-wise, bounding box, etc.) identifying one or more depicted plants having the progressive plant disease and/or one or more stages of the plant disease evident in one or more of the depicted plants (e.g., stage 1, stage 2, salvageable, non-salvageable, etc.). In some implementations, model 350 may be trained to generate annotation(s) identifying a severity of the plant disease in one or more of the depicted plants, which could be similar to stages of the disease or could be another numeric measure (e.g., 60% infected, 40% infected, salvageable, non-salvageable, etc.). In some implementations, model 350 may be trained to generate a prediction of how the plant disease will progress subsequently, or a prediction of how the plant disease will impact crop yield. For example, depending on where an afflicted plant is in its crop cycle, a plant disease may affect crop yield to various degrees, with earlier infection sometimes having a different (e.g., greater, lesser) impact on ultimate crop yield than later infection.

Figure 5:
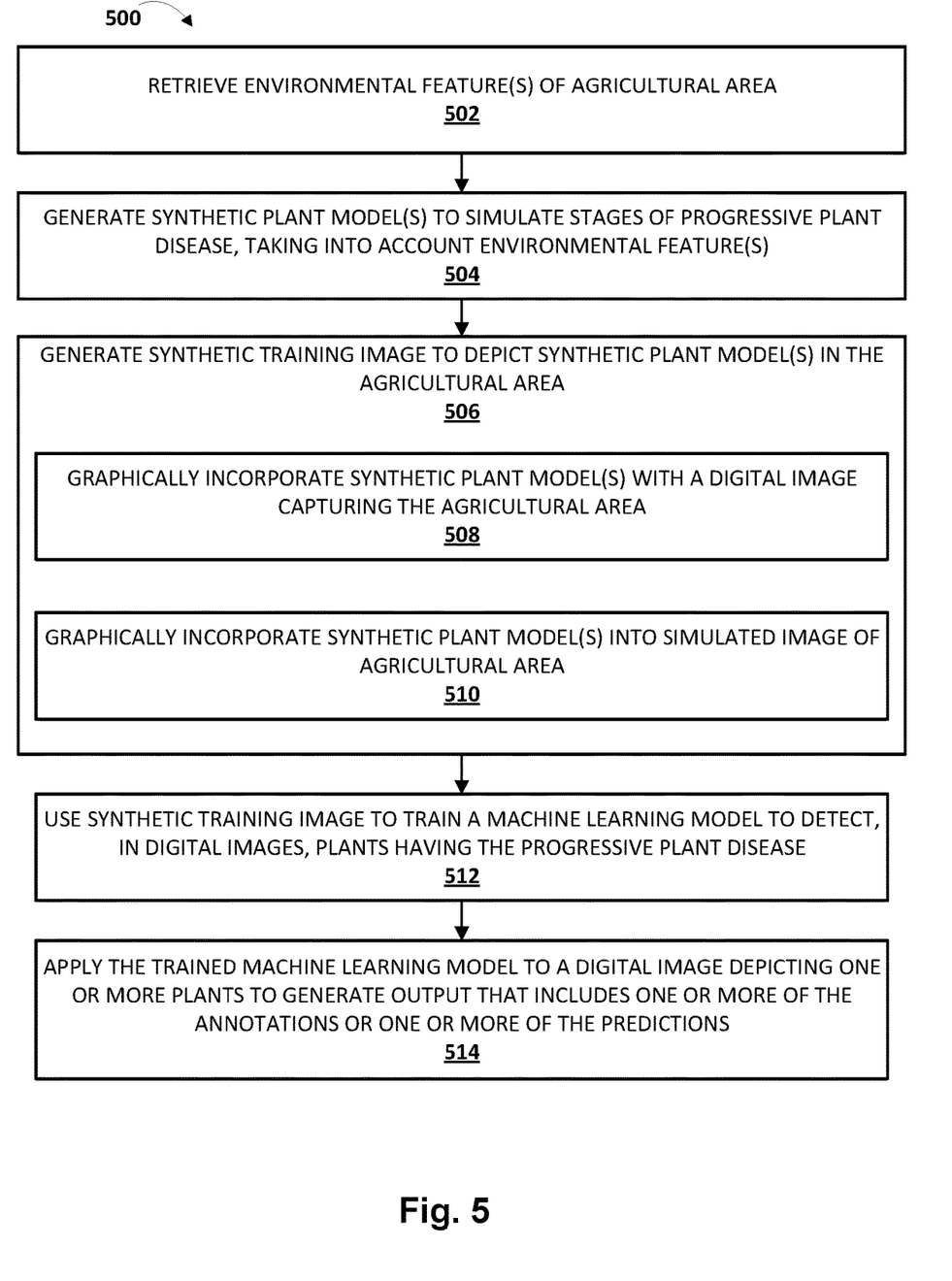
FIG. 5 is a flowchart of an example method in accordance with various implementations described herein.

FIG. 5 illustrates a flowchart of an example method 500 for practicing selected aspects of the present disclosure. The operations of FIG. 5 can be performed by one or more processors, such as one or more processors of the various computing devices/systems described herein, such as by plant knowledge system 104. For convenience, operations of method 500 will be described as being performed by a system configured with selected aspects of the present disclosure. Other implementations may include additional operations than those illustrated in FIG. 5, may perform step(s) of FIG. 5 in a different order and/or in parallel, and/or may omit one or more of the operations of FIG. 5.

At block 502, the system may retrieve one or more environmental features associated with an agricultural area. For example, object generator 242 and/or 3D simulator 244 may obtain, e.g., from records stored in a database, time-series data associated with agricultural area 112 that includes, for example, precipitation data, sunlight data, soil composition measurements over time, pesticide/fungicide application history, herbicide application history, fertilizer application history, etc.

At block 504, the system, e.g., by way of object generator 242 and/or 3D simulator 244, may generate one or more synthetic plant models that visually simulate one or more stages of a progressive plant disease, taking into account the one or more environmental features associated with the agricultural area. These synthetic plant models may be 2D or 3D, and may include "normal" assets like leaves, stems, fruits, flowers, etc., as well as disease assets such as spots, wilting, etc., that are selected at random, pseudo-randomly, and/or stochastically based at least in part on the environmental features. For example, the more favorable the conditions of the agricultural area to the targeted plant disease, the more obvious the plant disease symptoms may appear.

At block 506, the system, e.g., by way of synthetic training image generator 250, may graphically incorporate the one or more synthetic plant models into a synthetic training image that depicts the agricultural area. The underlying digital image may itself be "real" or synthetic. In the former case, at block 508, the system may graphically incorporate the one or more synthetic plant models into a digital image captured of the agricultural area using a camera. In the latter case, at block 510, the system may graphically incorporate the one or more synthetic plant models into a simulated image of the agricultural area.

At block 512, the system may use the synthetic training image generated at block 506 to train a machine learning model to detect and/or segment, in digital images, plants of a same type as at least some of the synthetic plant models that are afflicted with the same plant disease. For example, a CNN may be trained using the synthetic training image (and many more like it in some cases) to segment a digital image into different segments, some of which may represent the targeted plant type afflicted with the targeted plant disease.

In some implementations, the output of the CNN may be an image with annotations (e.g., pixel-wise or otherwise) identifying the targeted plant type and/or targeted plant disease. In some implementations, if any part of the plant shows symptoms of the plant disease, then the whole plant may be pixel-wise annotated (e.g., segmented) or captured in bounding box to indicate that the plant is afflicted with the disease. Alternatively, only those portions of the plants that are visibly afflicted with the plant disease (e.g., wilting or spotting) may be annotated (e.g., on a pixel-wise basis), and pixels corresponding to the rest of the plant that appears healthy may be annotated normally. As yet another example, the plant may be annotated to indicate the severity of the detected plant disease, e.g., with diseased and healthy pixels illustrating the severity, and/or with a percentage affliction and/or estimated stage of progression of the plant disease.

In some implementations, the machine learning model being trained at block 512 may be a time-series plant detection machine learning model (e.g., 350 in FIGS. 3 and 4) such as a RNN, LSTM, GRU, etc. As mentioned previously, such a time-series plant detection machine learning model may be trained, for instance, using synthetic training images generated as described previously, in combination with time-series environmental features. For example, temporal sequences of synthetic training images of an area may be generated at block 506. The synthetic plants may change across each successive synthetic training image, e.g., as shown in FIGS. 3-4. In some implementations, the progression of these synthetic plants/plant disease may result from the processing of corresponding time-series agricultural data.

In some implementations, at block 512, this temporal sequence of synthetic training images may be iteratively applied, along with corresponding time-series agricultural data, as inputs for the time-series plant detection machine learning model, as was illustrated in FIGS. 3-4. Any error in the detection or classification of targeted plants having targeted plant disease(s) may be used to train the time-series machine learning model (e.g., 350). Such a time-series plant detection machine learning model may also be trained with ground truth data such as temporal sequences of real (i.e. non-synthetic) images of targeted plants with and/or without plant disease over time.

At block 514, e.g., sometime later, the trained machine learning model may be applied to a digital image (e.g., captured by a robot 108) depicting one or more plants to generate output that includes one or more of the annotations or one or more of the predictions mentioned previously. This may occur, for instance, when a user interacts with agricultural client 107 operating on client device 106 to request a crop yield prediction. Alternatively, this may occur automatically at various points during a crop cycle, e.g., as part of a daily, weekly, and/or or monthly report. Alternatively, the operations of block 514 may occur as often as one or more robots 108 are able to capture digital images of a field or other agricultural area.

Figure 6:
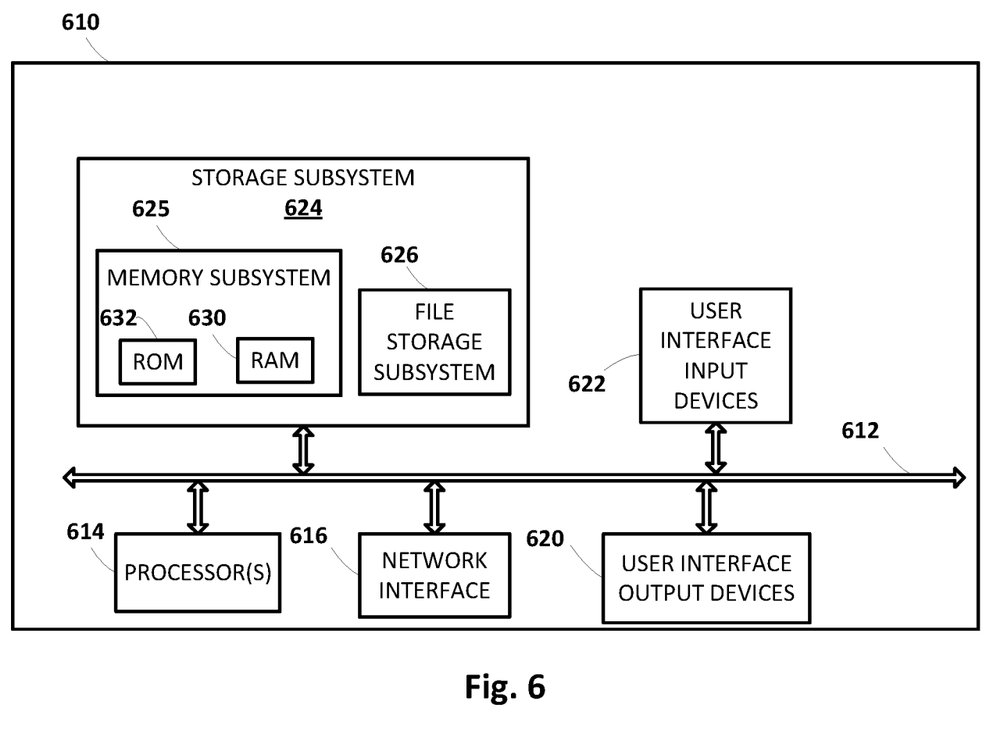
FIG. 6 schematically depicts an example architecture of a computer system.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In some implementations in which computing device 610 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of method 500 described herein, as well as to implement various components depicted in FIGS. 1 and 2.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:
   retrieving one or more environmental features associated with an agricultural area;
   generating one or more three-dimensional (3D) synthetic plant models, wherein each of the one or more 3D synthetic plant models visually simulates an individual plant that exhibits visual symptoms of one or more stages of a progressive plant disease, taking into account the one or more environmental features associated with the agricultural area; and
   graphically incorporating the one or more 3D synthetic plant models into a synthetic training image that depicts the agricultural area, whereby the resulting synthetic training image portrays the one or more 3D synthetic plant models growing in the agricultural area, wherein the graphically incorporating includes graphically incorporating the one or more 3D synthetic plant models into a simulated image of the agricultural area.

2. The method of claim 1, wherein the graphically incorporating includes graphically incorporating the one or more 3D synthetic plant models into a digital image captured of the agricultural area using a camera.

3. The method of claim 1, wherein one or both of the generating and graphically incorporating is performed using a machine learning model.

4. The method of claim 3, wherein the machine learning model comprises a generator model that forms part of a generative adversarial network ("GAN").

5. The method of claim 3, wherein the machine learning model is trained at least in part on a sequence of images that depict progression of the progressive plant disease.

6. The method of claim 1, wherein the one or more environmental features comprise time-series data corresponding to a plurality of environmental conditions of the area.

7. The method of claim 6, wherein the plurality of environmental conditions include two or more of temperature, precipitation, sunlight exposure, fertilizer application, soil composition, pH levels, or pesticide application.

8. The method of claim 1, further comprising using the synthetic training image to train a machine learning model to generate, based on digital images depicting one or more plants, one or more of:
   one or more annotations identifying one or more depicted plants having the progressive plant disease;
   one or more annotations identifying one or more stages of the plant disease evident in one or more of the depicted plants;
   one or more annotations identifying a severity of the plant disease in one or more of the depicted plants;
   a prediction of how the plant disease will progress subsequently; or
   a prediction of how the plant disease will impact crop yield.

9. The method of claim 8, further comprising applying the trained machine learning model to a digital image depicting one or more plants to generate output that includes one or more of the annotations or one or more of the predictions.

10. A system comprising one or more processors and memory storing instructions that, in response to execution of the instructions by the one or more processors, cause the one or more processors to:
    retrieve one or more environmental features associated with an agricultural area;
    generate one or more three-dimensional (3D) synthetic plant models, wherein each of the one or more 3D synthetic plant models visually simulates an individual plant that exhibits visual symptoms of one or more stages of a progressive plant disease, taking into account the one or more environmental features associated with the agricultural area; and
    graphically incorporate the one or more 3D synthetic plant models into a synthetic training image that depicts the agricultural area, whereby the resulting synthetic training image portrays the one or more 3D synthetic plant models growing in the agricultural area, wherein the one or more 3D synthetic plant models are graphically incorporated into a simulated image of the agricultural area.

11. The system of claim 10, wherein the graphically incorporating includes graphically incorporating the one or more 3D synthetic plant models into a digital image captured of the agricultural area using a camera.

12. The system of claim 10, wherein one or both of the generating and graphically incorporating is performed using a machine learning model.

13. The system of claim 12, wherein the machine learning model comprises a generator model that forms part of a generative adversarial network ("GAN").

14. The system of claim 12, wherein the machine learning model is trained at least in part on a sequence of images that depict progression or severity of the progressive plant disease.

15. The system of claim 10, wherein the one or more environmental features comprise time-series data corresponding to a plurality of environmental conditions of the area.

16. The system of claim 15, wherein the plurality of environmental conditions include two or more of temperature, precipitation, sunlight exposure, fertilizer application, soil composition, pH levels, or pesticide application.

17. The system of claim 10, further comprising using the synthetic training image to train a machine learning model to generate, based on digital images depicting one or more plants, one or more of:
- one or more annotations identifying one or more depicted plants having the progressive plant disease;
- one or more annotations identifying one or more stages of the plant disease evident in one or more of the depicted plants;
- one or more annotations identifying a severity of the plant disease in one or more of the depicted plants;
- a prediction of how the plant disease will progress subsequently; or
- a prediction of how the plant disease will impact crop yield.

18. At least one non-transitory computer-readable medium comprising instructions that, in response to execution of the instructions by one or more processors, cause the one or more processors to perform the following operations:
- retrieving one or more environmental features associated with an agricultural area;
- generating one or more three-dimensional (3D) synthetic plant models, wherein each of the one or more 3D synthetic plant models visually simulates an individual plant that exhibits visual symptoms of one or more stages of a progressive plant disease, taking into account the one or more environmental features associated with the agricultural area; and
- graphically incorporating the one or more 3D synthetic plant models into a synthetic training image that depicts the agricultural area, whereby the resulting synthetic training image portrays the one or more 3D synthetic plant models growing in the agricultural area, wherein the graphically incorporating includes graphically incorporating the one or more 3D synthetic plant models into a simulated image of the agricultural area.

* * * * *